United States Patent
Contractor et al.

(10) Patent No.: US 10,347,151 B2
(45) Date of Patent: Jul. 9, 2019

(54) STUDENT SPECIFIC LEARNING GRAPH

(71) Applicant: International Business Machines Corporation, Armonk, NY (US)

(72) Inventors: Danish Contractor, Gurgaon (IN); Ramesh Ambat Gopinath, Millwood, NY (US); Mukesh Kumar Mohania, New Delhi (IN); Sumit Negi, Ghaziabad (IN); Nitendra Rajput, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 14/537,344

(22) Filed: Nov. 10, 2014

(65) Prior Publication Data
US 2016/0133162 A1    May 12, 2016

(51) Int. Cl.
    *G09B 19/00* (2006.01)
(52) U.S. Cl.
    CPC .................. *G09B 19/00* (2013.01)
(58) Field of Classification Search
    CPC ... G09B 7/00; G09B 7/02; G09B 5/00; G09B 19/00; G06Q 10/0639; G06Q 10/06398; G06Q 50/20
    USPC ....................... 434/322, 323, 350
    See application file for complete search history.

(56) References Cited

U.S. PATENT DOCUMENTS

| | | | |
|---|---|---|---|
| 8,571,462 B2 | 10/2013 | Hochwarth et al. | |
| 2002/0142274 A1* | 10/2002 | Fujino | G09B 7/00 434/219 |
| 2004/0202987 A1* | 10/2004 | Scheuring | G09B 7/02 434/118 |
| 2012/0329027 A1 | 12/2012 | Lewolt | |
| 2013/0266922 A1 | 10/2013 | Needham et al. | |
| 2015/0106377 A1* | 4/2015 | Sri | G09B 7/00 707/740 |

OTHER PUBLICATIONS

Carchiolo, Vincenza et al., "A model for a web-based learning system", Inf Syst Front, 2007, 17 pages, Springer Publishing Company, New York, NY, USA.

(Continued)

*Primary Examiner* — Jerry-Daryl Fletcher
(74) *Attorney, Agent, or Firm* — Ference & Associates LLC

(57) ABSTRACT

Methods and arrangements for generating a learning graph. A contemplated method includes: utilizing at least one processor to execute instructions to perform the steps of: receiving a proficiency input relating to a student; receiving a target knowledge node, wherein the target knowledge node represents at least one skill the student does not currently possess; determining at least one skill requirement of the at least one skill; identifying at least one path between the proficiency input and the target knowledge node based upon the at least one determined skill requirement; calculating a gap between the proficiency input and the target knowledge node at the at least one identified path; and recommending at least one learning content module based upon the calculated gap.

19 Claims, 4 Drawing Sheets

(56) References Cited

OTHER PUBLICATIONS

Knewton, "Knewton Adaptive Learning—Building the world's most powerful education recommendation engine", 15 pages, http://www.knewton.com/platform/, Accessed on Sep. 16, 2014.

Klahr, David et al., "The Equivalence of Learning Paths in Early Science Instruction—Effects of Direct Instruction and Discovery Learning", Psychological Science, 2004, pp. 661-667, vol. 15, No. 10, American Psychological Society, Washington, D.C. USA.

Karampiperis, Pythagoras, et al., "Adaptive Learning Resources Sequencing in Educational Hypermedia Systems", Educational Technology & Society, 2005, pp. 128-147, vol. 8, Issue 4, International Forum of Educational Technology & Society (IFETS).

Janssen, Jose, et al., "Towards a learning path specification", Int. J. of Continuing Engineering Education and Life-Long Learning, 2008, pp. 77-97, vol. 18, Issue No. 1, Inderscience Publishers, Inderscience Enterprises, Ltd., www.inderscience.com, Accessed on Sep. 8, 2014.

Novak, Joseph D., "Learning, Creating, and Using Knowledge: Concept maps as facilitative tools in schools and corporations", Journal of e-Learning and Knowledge Society (Je-LKS), Sep. 2010, pp. 21-30, vol. 6, Issue No. 3, Italian e-Learning Association, Italy.

\* cited by examiner

STUDENT SPECIFIC LEARNING GRAPH

BACKGROUND

People continually try to learn new skills. Some people like to learn new skills for themselves, while others need or desire to learn new skills to advance their careers. Whatever the motivation in the desire to learn new skills, people may have trouble determining what is necessary to acquire the skill(s) they desire. For example, a person may not understand which courses act as prerequisites for the desired skill, at what proficiency a person should be at before attempting to learn the desired skill, what gaps a person should address to achieve the skill, what learning materials are associated with attaining the desired skill, and the like. As another example, a person may know the skill they desire to learn, but may not know where to start and what learning path to following, in learning that new skill.

BRIEF SUMMARY

In summary, one aspect of the invention provides a method of generating a learning graph, said method comprising: utilizing at least one processor to execute instructions to perform the steps of: receiving a proficiency input relating to a student; receiving a target knowledge node, wherein the target knowledge node represents at least one skill the student does not currently possess; determining at least one skill requirement of the at least one skill; identifying at least one path between the proficiency input and the target knowledge node based upon the at least one determined skill requirement; calculating a gap between the proficiency input and the target knowledge node at the at least one identified path; and recommending at least one learning content module based upon the calculated gap.

Another aspect of the invention provides an apparatus for generating a learning graph, said apparatus comprising: at least one processor; and a computer readable storage medium having computer readable program code embodied therewith and executable by the at least one processor, the computer readable program code comprising: computer readable program code configured to receive a proficiency input relating to a student; computer readable program code configured to receive a target knowledge node, wherein the target knowledge node represents at least one skill the student does not currently possess; computer readable program code configured to determine at least one skill requirement of the at least one skill; computer readable program code configured to identify at least one path between the proficiency input and the target knowledge node based upon the at least one determined skill requirement; computer readable program code configured to calculate a gap between the proficiency input and the target knowledge node at the at least one identified path; and computer readable program code configured to recommend at least one learning content module based upon the calculated gap.

An additional aspect of the invention provides a computer program product for generating a learning graph comprising: a computer readable storage medium having computer readable program code embodied therewith, the computer readable program code comprising: computer readable program code configured to receive a proficiency input relating to a student; computer readable program code configured to receive a target knowledge node, wherein the target knowledge node represents at least one skill the student does not currently possess; computer readable program code configured to determine at least one skill requirement of the at least one skill; computer readable program code configured to identify at least one path between the proficiency input and the target knowledge node based upon the at least one determined skill requirement; computer readable program code configured to calculate a gap between the proficiency input and the target knowledge node at the at least one identified path; and computer readable program code configured to recommend at least one learning content module based upon the calculated gap.

A further additional aspect of the invention provides a method of generating a learning graph, said method comprising: utilizing at least one processor to execute instructions to perform the steps of receiving a proficiency input relating to a student; receiving a target knowledge node, wherein the target knowledge node represents at least one skill the student does not currently possess; determining at least one skill requirement of the at least one skill; identifying at least one path between the proficiency input and the target knowledge node based upon the at least one determined skill requirement; calculating a gap between the proficiency input and the target knowledge node at the at least one identified path; and recommending at least one learning content module based upon the calculated gap via: computing a total effort required for attaining skills the student does not currently possess associated with the target knowledge node; determining a path, comprising the skills the student does not currently possess, requiring a total effort determined to be the least; and identifying at least one learning content module, within the determined path, the student does not currently possess.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
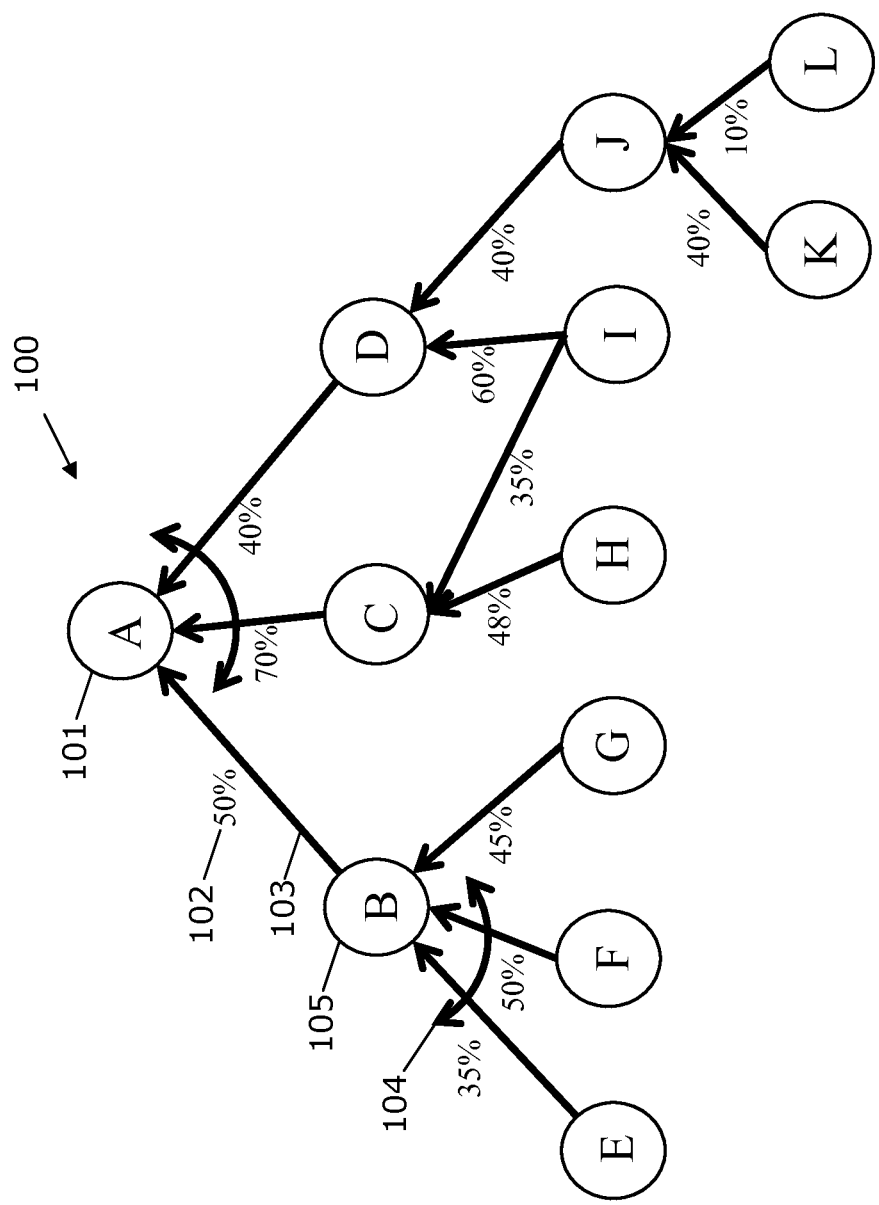
FIG. 1 depicts an example knowledge graph.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera in other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of Hocks in the block diagrams and/or flowchart illustration, can be implemented by special purpose hardware-based systems that perform the specified functions or acts, or combinations of special purpose hardware and computer instructions.

Specific reference will now be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect in FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are systems and arrangements that provide a learning graph to enable a student to determine what additional skills, if any, are necessary to learning a new desired skill. In one embodiment, the system may map the current proficiencies of a user on a skill dependency graph (also known as a knowledge graph) and calculate a gap between the student's current proficiencies and the proficiencies required to be proficient in the desired skill. Thus, an embodiment may use the knowledge relationship to determine the skills that an individual needs to acquire to learn a desired skill. One embodiment may identify skills that a student needs to increase before learning the desired skill. In accordance with one embodiment, a learning graph including knowledge paths may be displayed.

FIG. 1 illustrates an example knowledge graph. In one embodiment, a knowledge graph 100, such as the one shown in FIG. 1, may be generated. A target knowledge node 101, may include a skill that a student wants to learn. Nodes 105 may represent skills that must be learned (i.e., prerequisites) before the skill represented by the target knowledge node 101 may be acquired. Each node 105 may have a data structure that may contain a variety of information including, for example, comprehension quantification score, difficulty level quantification score, content, optional prerequisites, mandatory prerequisites, minimum scoring criteria of prerequisites, and the like. Prerequisites may be indicated by neighboring nodes 105, for example Node B is a prerequisite of Node A. Prerequisites may also be considered any node 105 that is required within the knowledge path ("path"), for example, Node G is a prerequisite of Node A. Table 1 below represents an example of how a node may contain information for course material relevant for that node.

TABLE 1

| Content Link | Comprehension Burden | Reviews | Format |
| --- | --- | --- | --- |
| <link1> | 24 | 6.5 | PPT |
| <link2> | 34 | 5.6 | Text |

A knowledge path may be considered the whole of the nodes 105 and edges 103 required to get from a skill to the target knowledge node 101. The edges may represent a prerequisite. For example, the edge between B and A identifies B as a prerequisite to A. The weights 102 of the edges 103 may represent proficiency required in the child node (i.e., the node required before a present node) to start the learning of the parent node (i.e., the present node). For example, Node H is the child node of Node C and Node C is the parent node of Node H. The arcs 104 may represent optional or alternative learning paths. For example, to start learning the skill associated with its ode B, a student can either have a proficiency of 35 in the skill associated with Node E or a proficiency of 50 in the skill associated with Node F.

Figure 3:
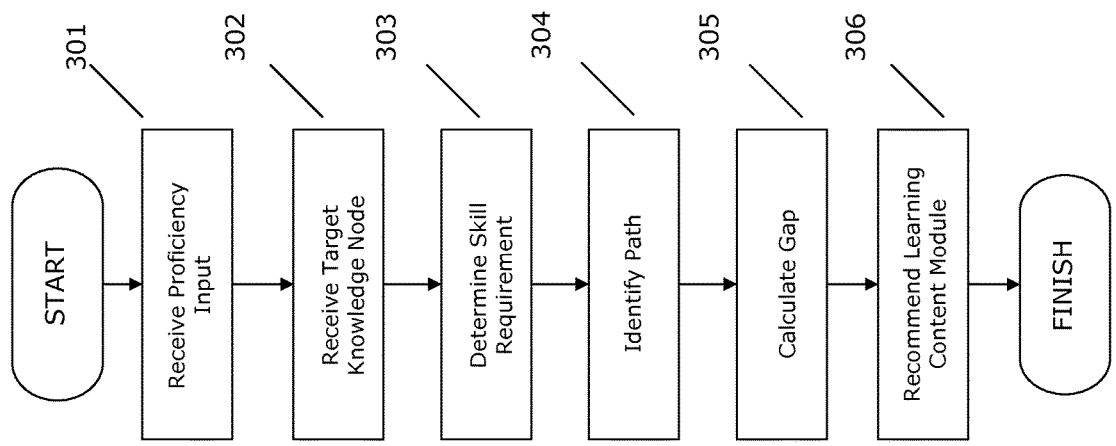
FIG. 3 schematically illustrates a system architecture for a student specific knowledge graph.

FIG. 3 schematically illustrates a system architecture for a student specific knowledge graph, in accordance with at least one embodiment of the invention. At 301, an embodiment may receive a proficiency input relating to a student ("student proficiency input"). The input may be received in a variety of ways. For example, the input may be entered manually into a computer, for example, through a keyboard input by a student, or the data may be obtained. For example, the data may be obtained through a network connection from a transcript of a student. Other methods of receiving the input are contemplated. In one embodiment, this student proficiency input may contain data including, for example, a skill a student currently possesses, previously completed course, the score associated with the previously completed course, retention ability score, learning style, comprehension ability, and other such information.

Additionally, in accordance with one embodiment, the student proficiency input may contain a previously completed course and that previously completed course may include a decay value. This decay value may reduce the proficiency score associated with the previously completed course. The decay value may allow a computation of a decrease in proficiency due to a passage of time. For example, a student may have preformed well in algebra. However, the student has not used algebra for a few years and their proficiency has been reduced. The decay value would account for this loss of proficiency. Within one embodiment, the student may be allowed to test or quiz the skill in order to prove their proficiency and reduce the decay value.

In accordance with one embodiment, the student proficiency input represents the concepts/skills the student has already acquired. FIG. 2 shows an example knowledge graph, as shown in FIG. 1, including a student proficiency input 201. The student may have an amount of proficiency 201 in skills included within a knowledge path. Per FIG. 2, the student may be have a proficiency of 50 in the skill associated with Node K, a proficiency of 10 in the skill associated with Node L, a proficiency of 20 in the skill associated with Node J, a proficiency of 50 in the skill associated with Node H, and a proficiency of 30 in the skill associated with Node I.

Referring back to FIG. 3, one embodiment may at 302 receive a target knowledge node 101, which may represent a skill a student does not currently possess. The skills that the student does not currently possess may be skills the student has not learned yet or may include skills that the student is not completely proficient in. In other words, the skills the student does not currently possess may include skills the student has some (proficiency in. Like the student proficiency input, these data may be received in a variety of ways. For example, it may be received manually, for example a student selecting a desired skill, or it may be received from a system.

At 303, an embodiment may determine at least one skill requirement of the target knowledge node. These skill requirements may be represented by the nodes 105, edges 103, and weights 102. In one embodiment, the skill requirement may comprise information such as comprehension difficulty score, proficiency requirement (represented by the edges 103 and weights 102) for the skill (represented by the nodes 105), prerequisite skill, proficiency requirement for the prerequisite skill, and other such information. In one embodiment, determining the skill requirement may include identifying at least one concept or skill as a prerequisite for the target knowledge node 101. For example, Node J is a prerequisite to Node D. Additionally, in accordance with one embodiment, determining the skill requirement may include identifying a necessary proficiency for the concept or skill identified as a prerequisite.

At 304, an embodiment may identify a knowledge path between the student proficiency input and the target knowledge node based upon the skill requirements. In other words, an embodiment may determine what skills the student needs to learn in order to learn the skill associated with the target knowledge node. The knowledge path identifies the skills and proficiencies associated with a target knowledge node 101.

At 305, an embodiment may calculate a gap between the student proficiency input and the target knowledge node based upon the identified knowledge path. The calculating of this gap, in one embodiment, may be accomplished by associating a known value representing the student proficiency with a node representing a skill. In addition, a required value may be associated with the node which represents a necessary proficiency needed to learn the target skill. The two values may then be compared to determine the deficiency of the student. Based upon this calculation, one embodiment may identify the requirements that a student must fulfill in order to reach the target skill. These requirements may include the skills that a student needs to learn to complete a knowledge path.

At 306, an embodiment may recommend a learning content module based upon the calculated gap. For example, if after calculating the gap at 305 an embodiment has identified requirements that the student is not proficient in yet, an embodiment may recommend learning content based upon identified requirements. This recommendation may be stored in memory for later access. Additionally or alternatively, this recommendation may be displayed on a display device (e.g., touch screen, monitor, display integrated in an information handling device, etc.).

In one embodiment, this recommendation may include recommending a particular class. Alternatively or additionally, this recommendation may include recommending a particular skill in which the student needs to increase proficiency before learning the desired skill. The recommendation may include more than one skill. Therefore, the learning content module may include a single skill and/or proficiency, or it may include a plurality of skills and/or proficiencies. Each node may contain information regarding what learning content needs to be learned in order to attain proficiency. For example, the edges 103 and weights 102 include a proficiency requirement. Additionally or alternatively, each node may contain other information regarding requirements for a particular node. For example, each node may have associated information, such as shown in Table 1 above, which may include information such as the comprehension burden for a particular node. In accordance with one embodiment, the recommendation may include a graphical representation. Additionally or alternatively, the recommendation may include text describing the skills a student needs to learn.

Figure 2:
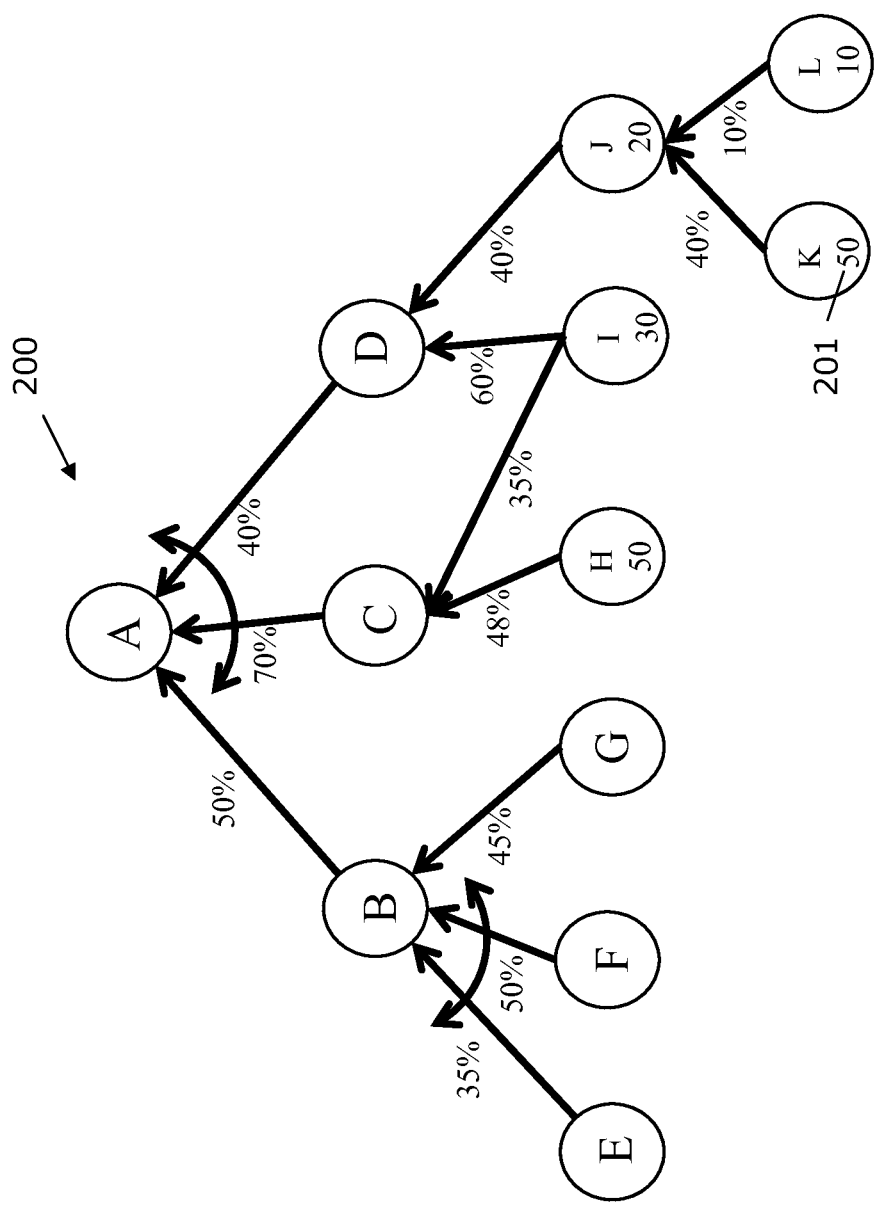
FIG. 2 depicts an example knowledge graph with a student proficiency input.

For example, FIG. 2 shows the knowledge path between the student proficiency input and the target knowledge, Node A. Each node 105 and 101 in the knowledge path may have a potential associated with it. This potential may be a function of the score required in any prerequisites and the minimum number of prerequisites and alternatives. An example calculation may be:

$$\text{Potential of a node} = \Sigma(w\_i) + \Sigma(\beta\_j * w\_j)/|M| + \Sigma(\beta\_j * |O|)$$

w_i=Minimum Score in the ith mandatory pre-requisite
w_j=Minimum Score in the jth non-mandatory pre-requisite
β_j=Importance factor in non-mandatory pre-requisite
M=Set of mandatory pre-requisites
O=Set of non-mandatory pre-requisites
|X|=Sum of Maximum Score possible in pre-requisites considered For a specific student, the calculation may be slightly modified, for example, like the following:

$$\text{Potential of a node} = \Pi 1\{w'\_i > w\_i\}[\Sigma(w'\_i)) + \Sigma(\beta\_j * w'\_j)/|M| + \Sigma(\beta\_j * |O|)]$$

1{f(x)} indicator function that returns 1 if f(x) is true.
w'_i=Score of the student in the ith mandatory pre-requisite of the new skill/concept
w'_j=Score of the student in the jth non-mandatory pre-requisite of the new skill/concept.
β_j=Importance factor in non-mandatory pre-requisite
M=Set of mandatory pre-requisites
O=Set of non-mandatory pre-requisites
|X|=Sum of Maximum Score possible in pre-requisites considered Referring back to the example in FIG. 2, the student has been determined to be proficient in the skills associated with Nodes K, L, and H. In other words, the student's potential difference in these skills is greater than or equal to 0. The student has some proficiency in the skills associated with Nodes I and J, but not the required proficiency amount. In other words, the student's potential difference is less than 0. Therefore, the student's knowledge path requires the student to become proficient (meeting the required proficiency in a skill) in the skills associated with E or F (F and F are alternates of each other so the student could become proficient in one or the other), G, B, I, J, and C or D. In order for the student to learn target skill A, the student would need to fulfill one of the knowledge paths. The different knowledge paths are identified by the alternatives. For the following abbreviated example, assume the skill associated with Node A only requires the prerequisites included the left side of FIG. 2 (i.e., Nodes A, B, E, F, and G). One knowledge path would include a student learning skills E, G, and B. The alternate knowledge path would include a student learning skills F, G, and B.

As an example, consider the following:
Factorization requires the following pre-requisites:
    Multiplication (Score=80%) (Mandatory)
    Division (Score=80%) (Mandatory)
    Arithmetic properties (Score=80%) (Not Mandatory)
    The potential for this node "Factorization" is 0.8.
Consider two students. The first having the following
    Multiplication (Has score=80%)
    Division (Has scored=50%)
    Arithmetic properties (Has scored=80%)
    The potential for this student is 0.68.
The second student having the following skills:
    Multiplication (Score=80%)
    Division (Score=80%)
    The potential for this student is 0.8.
The first student would not be able to take Factorization and would need to gain proficiency in Division. The second student, however, would be able to take Factorization.

In one embodiment, the recommending at 306, may be accomplished by computing a total effort required for attaining skills the student does not currently possess. An embodiment may then determine a path comprising these skills that the student does not currently possess requiring the least amount of total effort. The skills that the student does not currently possess may be skills the student has not learned yet or may include skills that the student is not completely proficient in. In other words, the skills the student does not currently possess may include skills the student has some proficiency in. An embodiment may then recommend the learning content module based upon the path including the skills the student does not currently possess that require the least amount of effort by the student to become proficient in.

In one embodiment, a preferred knowledge path may be identified. The preferred knowledge path may represent the knowledge path in which the calculated gap is determined to be the least. In other words, this preferred path may represent the knowledge path that a student may take in order to expend the least amount of effort. For example, referring to FIG. 2, the preferred knowledge path may include the student acquiring a proficiency in the skills associated with Nodes F, G, B, I (up to 35%), and C.

One example of the way this preferred knowledge path may be identified is represented in the code that follows. The code includes information regarding target node t and current student skill profile S, which consists of nodes in the knowledge graph along with information, for example, about student aptitude, performance in pre-requisites of each skill node, decay of each pre-requisite, and the like. The code then overlays the student profile and the target node t on the knowledge graph and executes a breadth-first search (BFS) traversal from the target node to the nodes in the student profile. Let the first level of nodes reached during the traversal be M.

```
For each m in M
{
    For each path p between m and T
        { p.path_effort=0;
          For each node n on path p
          {
              profScore=GetStudentProficiencyScore(n,S);
              If(profScore < MinRequiredProficiencyScore(n)
              {
                  p.path_effort=p.path_effort+ getGapPotential(n,S);
              }
         }}
recommendPath = path with minimum path effort score.
```

In accordance with one embodiment, a knowledge graph may be displayed. This knowledge graph 100 in FIG. 1, may include at least one knowledge path. The knowledge path may contain the target knowledge node 101, any prerequisite nodes 105, and a proficiency 103 and 102 associated with the skill represented by the nodes 105 and 101.

Figure 4:
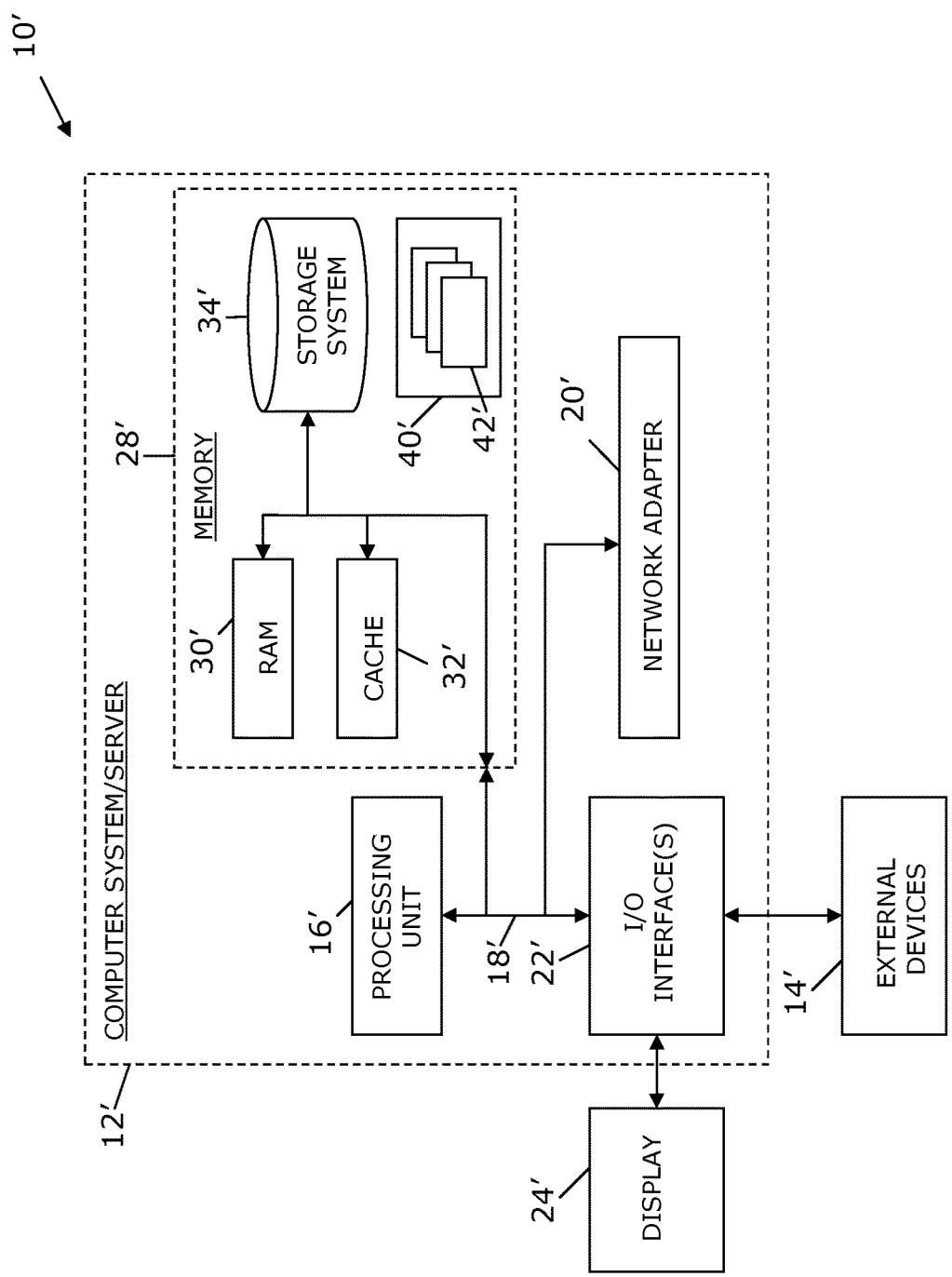
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of generating a learning graph, said method comprising:
utilizing at least one processor to execute instructions to perform the steps of:
receiving a proficiency input relating to a student, wherein the proficiency input identifies at least one current skill that the student currently possesses;
representing the proficiency input as at least one node of a generated learning graph comprising a plurality of nodes and a plurality of edges, wherein each node of the generated learning graph comprises a data structure comprising information related to comprehension qualification score, difficulty level quantification score, content, and prerequisites and wherein each of the plurality of edges connects two of the nodes and represents a relationship between the connected nodes, wherein the proficiency input represented as at least one node comprises a proficiency score, wherein the proficiency score comprises a decay value that reduces the proficiency score based upon a passage of time since use of the current skill represented by the proficiency input;
receiving a target knowledge node, wherein the target knowledge node represents at least one skill the student does not currently possess;
determining at least one skill requirement of the at least one skill the student does not currently possess, wherein the determining comprises identifying a comprehension difficulty score, proficiency requirement, and prerequisite of the at least one skill the student does not currently possess by identifying the nodes within the generated learning graph connected to the target knowledge node by one of the plurality of edges associated with the at least one skill the student does not currently possess;
identifying a plurality of alternate paths between the proficiency input and the target knowledge node based upon the at least one determined skill requirement, wherein each of the alternate paths identifies skills and proficiencies required for traversing a corresponding path and wherein at least one of the identified paths comprises a path requiring a least amount of total effort by the student;
calculating a gap between the proficiency input and the target knowledge node for each of the alternate paths, wherein the calculating a gap comprises determining at least one deficiency of the student between the at least one node corresponding to the proficiency input and the target knowledge node; and
selecting, based upon identifying one of the alternate paths having a least calculated gap, one of the alternate paths and recommending at least one learning content module based upon the selected path and the calculated gap corresponding to the selected path, wherein the recommended at least one learning content module would correct the determined at least one deficiency.

2. The method of claim 1, wherein the calculating a gap comprises:
associating a known value with a node, wherein the known value represents a student proficiency based upon the proficiency input;
associating a required value with a node, wherein the required value represents a necessary proficiency based upon the target knowledge node; and
comparing the known value with the required value.

3. The method of claim 1, further comprising:
displaying a knowledge graph comprising the selected path, wherein the selected path comprises the target knowledge node, at least one prerequisite node, and a connecting path between the target knowledge node and the at least one prerequisite node,
the at least one prerequisite node representing a skill within the selected path, and the connecting path representing a required proficiency associated with the at least one skill the student does not currently possess.

4. The method of claim 1, further comprising identifying a preferred learning graph, wherein the preferred learning graph comprises at least one path where the calculated gap between the proficiency input and the target knowledge node is determined to be the least.

5. The method of claim 1, wherein the recommending comprises identifying requirements of at least one learning graph based upon the calculated gap, wherein the requirements identify at least one skill the student does not currently possess.

6. The method of claim 1, wherein the determining at least one skill requirement comprises identifying at least one concept as a prerequisite for the target knowledge node.

7. The method of claim 6, wherein the determining at least one skill requirement further comprises identifying a necessary proficiency for the at least one concept.

8. The method of claim 1, wherein the proficiency input comprises at least one of: a previously completed course, a retention ability score, a learning style, and a comprehension ability.

9. The method of claim 8, wherein the proficiency input comprises a previously completed course and the previously completed course comprises a decay value, wherein the decay value reduces a proficiency score associated with a previously completed course.

10. The method of claim 1, wherein the at least one skill requirement comprises a proficiency requirement for the prerequisite skill.

11. An apparatus for generating a learning graph, said apparatus comprising:
at least one processor; and
a non-transitory computer readable storage medium having computer readable program code embodied therewith and executable by the at least one processor, the computer readable program code comprising:
computer readable program code configured to receive a proficiency input relating to a student, wherein the proficiency input identifies at least one current skill that the student currently possesses;
computer readable program code configured to represent the proficiency input as at least one node of a generated learning graph comprising a plurality of nodes and a plurality of edges, wherein each node of the generated learning graph comprises a data structure comprising information related to comprehension qualification score, difficulty level quantification score, content, and prerequisites and wherein each of the plurality of edges connects two of the nodes and represents a relationship between the connected nodes, wherein the proficiency input represented as at least one node comprises a proficiency score, wherein the proficiency score comprises a decay value that reduces the proficiency score based upon a passage of time since use of the current skill represented by the proficiency input;
computer readable program code configured to receive a target knowledge node, wherein the target knowledge node represents at least one skill the student does not currently possess;
computer readable program code configured to determine at least one skill requirement of the at least one skill the student does not currently possess, wherein the determining comprises identifying a comprehension difficulty score, proficiency requirement, and prerequisite of the at least one skill the student does not currently possess by identifying the nodes within the generated learning graph connected to the target knowledge node by one of the plurality of edges associated with the at least one skill the student does not currently possess;
computer readable program code configured to identify a plurality of alternate paths between the proficiency input and the target knowledge node based upon the at least one determined skill requirement, wherein each of the alternate paths identifies skills and proficiencies required for traversing a corresponding path and wherein at least one of the identified paths comprises a path requiring a least amount of total effort by the student;

computer readable program code configured to calculate a gap between the proficiency input and the target knowledge node for each of the alternate paths, wherein the calculating a gap comprises determining at least one deficiency of the student between the at least one node corresponding to the proficiency input and the target knowledge node; and computer readable program code configured to select, based upon identifying one of the alternate paths having a least calculated gap, one of the alternate paths and recommend at least one learning content module based upon the selected path and the calculated gap corresponding to the selected path, wherein the recommended at least one learning content module would correct the determined at least one deficiency.

12. The computer program product of claim 11, wherein the proficiency input comprises at least one of: a previously completed course, a retention ability score, a learning style, and a comprehension ability.

13. A computer program product for generating a learning graph comprising:
a non-transitory computer readable storage medium having computer readable program code embodied therewith, the computer readable program code comprising:
computer readable program code configured to receive a proficiency input relating to a student, wherein the proficiency input identifies at least one current skill that the student currently possesses;
computer readable program code configured to represent the proficiency input as at least one node of a generated learning graph comprising a plurality of nodes and a plurality of edges, wherein each node of the generated learning graph comprises a data structure comprising information related to comprehension qualification score, difficulty level quantification score, content, and prerequisites and wherein each of the plurality of edges connects two of the nodes and represents a relationship between the connected nodes, wherein the proficiency input represented as at least one node comprises a proficiency score, wherein the proficiency score comprises a decay value that reduces the proficiency score based upon a passage of time since use of the current skill represented by the proficiency input;
computer readable program code configured to receive a target knowledge node, wherein the target knowledge node represents at least one skill the student does not currently possess;
computer readable program code configured to determine at least one skill requirement of the at least one skill the student does not currently possess, wherein the determining comprises identifying a comprehension difficulty score, proficiency requirement, and prerequisite of the at least one skill the student does not currently possess by identifying the nodes within the generated learning graph connected to the target knowledge node by one of the plurality of edges associated with the at least one skill the student does not currently possess;
computer readable program code configured to identify a plurality of alternate paths between the proficiency input and the target knowledge node based upon the at least one determined skill requirement, wherein each of the alternate paths identifies skills and proficiencies required for traversing a corresponding path and wherein at least one of the identified paths comprises a path requiring a least amount of total effort by the student;

computer readable program code configured to calculate a gap between the proficiency input and the target knowledge node for each of the alternate paths, wherein the calculating a gap comprises determining at least one deficiency of the student between the at least one node corresponding to the proficiency input and the target knowledge node; and computer readable program code configured to select, based upon identifying one of the alternate paths having a least calculated gap, one of the alternate paths and recommend at least one learning content module based upon the selected path and the calculated gap corresponding to the selected path, wherein the recommended at least one learning content module would correct the determined at least one deficiency.

14. The computer program product of claim 13, wherein to calculate a gap comprises:

associating a known value with a node, wherein the known value represents a student proficiency based upon the proficiency input;

associating a required value with a node, wherein the required value represents a necessary proficiency based upon the target knowledge node; and comparing the known value with the required value.

15. The computer program product of claim 13, comprising displaying a knowledge graph comprising the selected path, wherein the selected one path comprises the target knowledge node, at least one prerequisite node, and a connecting path between the target knowledge node and the at least one prerequisite node, the at least one prerequisite node representing a skill within the selected path, and the connecting path representing a required proficiency associated with the at least one skill the student does not currently possess.

16. The computer program product of claim 13, comprising identifying a preferred learning graph, wherein the preferred learning graph comprises at least one path where the calculated gap between the proficiency input and the target knowledge node is determined to be the least.

17. The computer program product of claim 13, wherein to recommend comprises identifying requirements of at least one learning graph based upon the calculated gap, wherein the requirements identify at least one skill the student does not currently possess.

18. The computer program product of claim 13, wherein to determine at least one skill requirement comprises identifying at least one concept as a prerequisite for the target knowledge node.

19. The computer program product of claim 18, wherein to determine at least one skill requirement further comprises identifying a necessary proficiency for the at least one concept.

* * * * *